US012686616B2

(12) United States Patent　　(10) Patent No.: US 12,686,616 B2
Saleh et al.　　　　　　　　　(45) Date of Patent:　Jul. 21, 2026

(54) MODIFIED MULTI-WALLED CARBON NANOTUBES INCLUDING MULTI-WALLED CARBON NANOTUBES AND CARBOXYLATE MOIETIES AND RELATED METHODS

(71) Applicants:Saudi Arabian Oil Company, Dhahran (SA); King Fahd University of Petroleum & Minerals, Dhahran (SA)

(72) Inventors: Tawfik A. Saleh, Dhahran (SA); Elaf A. Ahmed, Dhahran (SA); Danah Almoshawer, Dhahran (SA); Hasan Al Abdulgader, Dhahran (SA); Abdullahi B. Olabintan, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 510 days.

(21) Appl. No.: 18/450,815

(22) Filed: Aug. 16, 2023

(65) Prior Publication Data

US 2025/0059048 A1　　Feb. 20, 2025

(51) Int. Cl.
　　*C01B 32/174*　　(2017.01)
　　*B01J 20/20*　　(2006.01)
　　　　(Continued)

(52) U.S. Cl.
　　CPC ........... C01B 32/174 (2017.08); B01J 20/205 (2013.01); B01J 20/22 (2013.01);
　　　　(Continued)

(58) Field of Classification Search
　　CPC .............. C01B 32/174; C01B 2202/06; C01B 2202/34; C01B 2202/36; C01B 32/158; C01B 32/159; C01B 32/16; C01B 32/162; C01B 32/164; C01B 32/166; C01B 32/168; C01B 32/17; C01B 32/172; C01B 32/176; C01B 32/178; C01B 2202/00; C01B 2202/02; C01B 2202/04; C01B 2202/08; C01B 2202/10; C01B 2202/20; C01B 2202/22; C01B 2202/24; C01B 2202/26; C01B 2202/28; C01B 2202/30;
　　　　(Continued)

(56) References Cited

U.S. PATENT DOCUMENTS 8,808,580 B2　8/2014　Plee et al.
2022/0211878 A1*　7/2022　Yantasee .............. A61K 49/186

FOREIGN PATENT DOCUMENTS

CN　　105968254　　9/2016
CN　　107876033　　4/2018
　　　　(Continued)

OTHER PUBLICATIONS

Definition of carboxylate, accessed online at https://www.merriam-webster.com/dictionary/carboxylate on Mar. 7, 2026 (Year: 2026).*
(Continued)

*Primary Examiner* — Daniel C. McCracken
(74) *Attorney, Agent, or Firm* — Fish & Richardson P.C.

(57) ABSTRACT

The disclosure relates to modified multi-walled carbon nanotubes (MWCNTs) that include MWCNTs with carboxylate moieties (e.g., laurate moieties) covalently bonded thereto, and related methods.

20 Claims, 6 Drawing Sheets

(51) Int. Cl.

| | | |
|---|---|---|
| *B01J 20/22* | (2006.01) | |
| *B01J 20/28* | (2006.01) | |
| *B01J 20/32* | (2006.01) | |
| *B82Y 30/00* | (2011.01) | |
| *B82Y 40/00* | (2011.01) | |
| *C02F 1/28* | (2023.01) | |
| *C02F 101/32* | (2006.01) | |
| *C02F 103/10* | (2006.01) | |
| *C09K 8/506* | (2006.01) | |
| *E21B 43/34* | (2006.01) | |

(52) U.S. Cl.
CPC ..... *B01J 20/28007* (2013.01); *B01J 20/3204* (2013.01); *B01J 20/3219* (2013.01); *B01J 20/3248* (2013.01); *B01J 20/3293* (2013.01); *C02F 1/288* (2013.01); *C09K 8/506* (2013.01); *E21B 43/34* (2013.01); *B82Y 30/00* (2013.01); *B82Y 40/00* (2013.01); *C01B 2202/06* (2013.01); *C01B 2202/34* (2013.01); *C01B 2202/36* (2013.01); *C01P 2006/19* (2013.01); *C02F 1/283* (2013.01); *C02F 1/285* (2013.01); *C02F 2101/32* (2013.01); *C02F 2103/10* (2013.01); *C09K 2208/10* (2013.01)

(58) Field of Classification Search
CPC ..... C01B 2202/32; B01J 20/205; B01J 20/22; B01J 20/28007; B01J 20/3204; B01J 20/3219; B01J 20/3248; B01J 20/3293; C02F 1/288; C02F 1/283; C02F 1/285; C02F 2101/32; C02F 2103/10; C09K 8/506; C09K 2208/10; E21B 43/34; B82Y 30/00; B82Y 40/00; C01P 2006/19; D01F 9/12; D01F 9/127; D01F 9/1271; D01F 9/1272; D01F 9/1273; D01F 9/1274; D01F 9/1275; D01F 9/1276; D01F 9/1277; D01F 9/1278; D01F 9/133
See application file for complete search history.

(56) References Cited

FOREIGN PATENT DOCUMENTS

| | | |
|---|---|---|
| CN | 108192141 | 6/2018 |
| CN | 107556973 | 3/2021 |

OTHER PUBLICATIONS

Hirsh, et al., Functionalization of Carbon Nanotubes, Top Curr Chem 2005; 245: 193-237 (Year: 2005).*

Al-Jammal, et al., Functionalized carbon nanotubes for hydrocarbon removal from water, Journal of Environmental Chemical Engineering 2020; 8: 103570, pp. 1-13 (Year: 2020).*

Written Opinion for PCT/US2024/042287 (Year: 2025).*

Aguilera et al., "Review on the effects of exposure to spilled oils on human health," J. Appl. Toxicol., May 2010, 30(4):291-301, 11 pages.

Ahmaruzzaman, "Industrial wastes as low-cost potential adsorbents for the treatment of wastewater laden with heavy metals," Adv. Colloid Interface Sci., Aug. 2011, 166(1-2):36.-59, 24 pages.

Al Jammal et al., "Modified Jordanian zeolitic tuff in hydrocarbon removal from surface water," J. Environ. Manage., Jun. 2019, 239(1):333-341, 9 pages.

Al-Jammala et al., Functionalized carbon nanotubes for hydrocarbon removal from water. Journal of Environmental Chemical Engineering, 2020, 8, 103570, 13 pages.

Allan et al., "Impact of the Deepwater Horizon Oil Spill on Bioavailable Polycyclic Aromatic Hydrocarbons in Gulf of Mexico Coastal Waters," Environ. Sci. Technol., 2012, 46(4):2033-2039, 7 pages.

Chang et al., "Consequences of oil spills: a review and framework for informing planning," Ecology and Society, 2014, 19(2), 26 pages.

De Gisi et al., "Characteristics and adsorption capacities of lowcost sorbents for wastewater treatment: a review," Sustain. Mater., Technol., Sep. 2016, 9, 10-40, 31 pages.

Deschamps et al., "Oil removal from water by selective sorption on hydrophobic cotton fibers. 1. Study of sorption properties and comparison with other cotton fiber-based sorbents, " Environ. Sci. Technol. Mar. 2003, 37(5):1013-1015, 3 pages.

Farbod et al., "Electrical properties and glass transition temperature of multiwalled carbon nanotube/polyaniline composites," Journal of Non-Crystalline Solids, Jun. 2012, 358(11):1339-1344, 6 pages.

Gui et al., "Magnetic And Highly Recyclable Macroporous Carbon Nanotubes For Spilled Oil Sorption and Separation," ACS Appl. Mater. Interfaces, May 2013, 5(12):5845-5850, 6 pages.

Gui et al., "Recyclable carbon nanotube sponges for oil absorption," Acta Mater., Jul. 2011, 59(12):4798-4804, 7 pages.

Hashim et al., "Covalently bonded three-dimensional carbon nanotube solids via boron induced nanojunctions," Scientific Reports, Apr. 2012, 2, 363, 8 pages.

Hirsch et al., "Functionalization of single-walled carbon nanotubes," Minireview, Angewandte Chemie International Edition, May 2002, 41(11):1853-1859, 7 pages.

Jiang et al., "Removal of oil from water using magnetic bicomponent composite nanofibers fabricated by electrospinning," Composites, Part B. Aug. 2015, 77, 311-318, 8 pages.

Kang et al., "A facile preparation of multiwalled carbon nanotubes modified with hydroxyl groups and their high dispersibility in ethanol," Colloids and Surfaces A: Physicochemical and Engineering Aspects, Jul. 2011, 384, 363-367, 5 pages.

Kujawinski et al., "Fate of dispersants associated with the Deepwater Horizon Oil Spill," Environ. Sci. Technol., Jan. 2011, 45(4), 1298-1306, 9 pages.

Le et al., "Surface modification and functionalization of carbon nanotube with some organic compounds," Adv. Nat. Sci. Nanosci. Nanotechnol., 2013, 4, 035017, 5 pages.

Liu et al., "Evaluation of Hydrophobic Polyurethane Foam as Sorbent Material for Oil Spill Recovery," J. Macromol. Sci., Dec. 2014, 51(1): 88-100, 14 pages.

Maphutha et al., "A Carbon Nanotube-Infused Polysulfone Membrane with Polyvinyl Alcohol Layer for Treating Oil-Containing Waste Water," Sci.Rep., Mar. 2013, 3, 1509, 6 pages.

Meng et al., "Advanced technology for functionalization of carbon nanotubes, Prog. Nat. Sci., Jul. 2009, 19(7):801-810, 10 pages.

Mullin et al., "Introduction/Overview to In Situ Burning of Oil Spills," Spill Sci. Technol. Bull, Aug. 2003, 8(4):323-330, 8 pages.

Nguyen et al., "Superhydrophobic and Superoleopholic Properties of Graphene-Based Sponges Fabricated Using a Facile Dip Coat Method," Energy Environ. Sci. May 2012, 5(7), 7908-7912, 5 pages.

Salanitro et al., "Crude Oil Hydrocarbon Bioremediation and Soil Ecotoxicity Assessment," Environ. Sci. Technol., May 1997, 31(6):1769-1776, 8 pages.

Saleh et al., "Efficient chemical etching procedure for the generation of superhydrophobic surfaces for separation of oil from water," Prog. Org. Coat., Aug. 2019 133, 27-32, 6 pages.

Shen et al., "How carboxylic groupsimprove the performance of single-walled carbon nanotube electrochemical capacitors?" Energy Environ. Sci., Aug. 2011, 4(10):4220-4229, 10 pages.

Song et al., "Superhydrophilic cement-coated mesh: an acid, alkali, and organic reagent-free material for oil/water separation," Nanoscale, 2018, 10 pages.

Sun et al., "Hydrophobic carbon nanotubes for removal of oils and organics from water," J. Mater. Sci., Jun. 2014, 49(20):6855-6861, 7 pages.

Toyoda et al., Heavy oil sorption using exfoliated graphite new application of exfoliated graphite to protect heavy oil pollution Carbon, 2000, 38(2):199-210, 12 pages.

Wang et al., "A novel carbon nanotubes reinforced superhydrophobic and superoleophilic polyurethane sponge for selective oil-water separation through a chemical fabrication," J. Mater. Chem. A, 2015, 3, 266-273, 8 pages.

(56)        References Cited

OTHER PUBLICATIONS

Wu et al., "Carbon nanofiber aerogels for emergent cleanup of oil spillage and chemical leakage under harsh conditions," Sci. Rep. 2015, 4:4079, 6 pages.

Xue et al., "Special wettable materials for oil/water separation," J. Mater. Chem. A, 2014, 2(8):2445-2460, 16 pages.

Zhongxin et al., "Special wettable materials for oil/water separation," J. Mater. Chem. A., Oct. 2014, 2(8):2445-2460, 16 pages.

Zhu et al., "A Robust and Cost-Effective Superhydrophobic Graphene Foam for Efficient Oil and Organic Solvent Recovery," Small, Oct. 2015, 11(39):5222-5229, 8 pages.

International Search Report and Written Opinion in International Appln. No. PCT/US2024/042287, mailed on Nov. 4, 2025, 9 pages.

International Preliminary Report on Patentability in International Appln. No. PCT/US2024/042287, mailed on Feb. 26, 2026, 7 pages.

Mallakpour et al., "Effect of amino acid-functionalized multi-walled carbon nanotubes on the properties of dopamine-based poly(amide-imide) composites: An experimental study," Bulletin of Materials Science, Aug. 2014, 37(5):1065-1077, 14 pages.

Voge et al., "Wrapping and dispersion of multiwalled carbon nanotubes improve electrical conductivity of protein-nanotube composite biomaterials," Journal of biomedical materials research Part A, Aug. 3, 2012, 101A(1):231-238, 8 pages.

Vukovic et al., "Synthesis, characterization and cytotoxicity of surface amino-functionalized water-dispersible multi-walled carbon nanotubes," Applied Surface Science, Jun. 30, 2009, 255(18):8067-8075, 9 pages.

Prendergast et al., "Assessing the Performance and Cost of Oil Spill Remediation Technologies," J. Cleaner Production, Sep. 2014, 78, 233-242, 10 pages.

Yaghoubi et al., "Silanization of multi-walled carbon nanotubes and the study of its effects on the properties of polyurethane rigid foam nanocomposites," Composites Part A., Jun. 2018, 109, 338-344, 7 pages.

* cited by examiner 140.08 ± 1.75°

145.26 ± 1.57°

141.02 ± 1.48°

5.54 ± 1.26°

MODIFIED MULTI-WALLED CARBON NANOTUBES INCLUDING MULTI-WALLED CARBON NANOTUBES AND CARBOXYLATE MOIETIES AND RELATED METHODS

FIELD

The disclosure relates to modified multi-walled carbon nanotubes (MWCNTs) that include MWCNTs with carboxylate moieties (e.g., laurate moieties) covalently bonded thereto, and related methods.

BACKGROUND

Activated carbon, MWCNTs, carbon nanofibers, carbon aerogels, porous carbon nanoparticles, carbon coatings and graphene sponges have been explored for use in oil spill remediation, oil-water separation, water filtration and gas purification and separation applications.

SUMMARY

The disclosure relates to modified MWCNTs that include MWCNTs with carboxylate moieties (e.g., laurate moieties) covalently bonded thereto, and related methods.

The modified MWCNTs can have relatively good mechanical properties and/or relatively low costs of formation relative to certain other nanomaterials.

The modified MWCNTs can be used to remove an organic contaminant from water. The modified MWCNTs can have relatively good mechanical stability, relatively high affinity for hydrophobic/oleophilic molecules, relatively high absorption capacities, relatively high surface areas, relatively fast absorption rates and/or relatively tunable surface chemistries, making them well suited for oil-water separation applications. The modified MWCNTs can have relatively good absorption capacities and/or separation efficiencies relative to certain other absorbents. The modified MWCNTs can be relatively efficient at absorbing an organic contaminant from water.

The modified MWCNTs and methods can be used in a variety of oil-water separation applications, such as oil spills, treatment of produced water and in gas-oil separation plants (GOSP).

The methods of making the modified MWCNTs can be relatively easy and inexpensive to implement and relatively scalable compared to certain other absorbent materials and methods that include MWCNTs and/or other nanomaterials. The precursor materials may be relatively inexpensive relative to certain other precursor materials for absorbents.

In a first aspect, the disclosure provides a modified multi-walled carbon nanotube (MWCNT) including a MWCNT including an outer surface, and a plurality of $C_{8-26}$ carboxylate moieties covalently bonded to the multi-walled carbon nanotube.

In some embodiments, the MWCNT includes an outer surface, and the plurality of $C_{8-26}$ carboxylate moieties are covalently bonded to the outer surface.

In some embodiments, the modified MWCNT has a water contact angle of 135° to 150°. In some embodiments, the modified MWCNT has an absorption capacity of at least 25 g/g for hexadecane. In some embodiments, the modified MWCNT has an absorption capacity of at least 20 g/g for dodecane. In some embodiments, the modified MWCNT has an absorption capacity of at least 20 g/g for decane. In some embodiments, the modified MWCNT has an absorption capacity of at least 15 g/g for hexane.

In some embodiments, the modified MWCNT has a separation efficiency of at least 90% for hexadecane in water. In some embodiments, the modified MWCNT has a separation efficiency of at least 90% for dodecane in water. In some embodiments, the modified MWCNT has a separation efficiency of at least 90% for decane in water. In some embodiments, the modified MWCNT has a separation efficiency of at least 90% for hexane in water.

In some embodiments, the modified MWCNT has an absorption capacity of at least 25 g/g for hexadecane after 5 cycles of oil water separation. In some embodiments, the modified MWCNT has an absorption capacity of at least 20 g/g for dodecane after 5 cycles of oil water separation. In some embodiments, the modified MWCNT has an absorption capacity of at least 20 g/g for decane after 5 cycles of oil water separation. In some embodiments, the modified MWCNT has an absorption capacity of at least 15 g/g for hexane after 5 cycles of oil water separation.

In some embodiments, an absorption capacity after five absorption-desorption cycles in hexadecane is at least 90% relative to an absorption capacity after the first absorption. In some embodiments, an absorption capacity after five absorption-desorption cycles in dodecane is at least 90% relative to an absorption capacity after the first absorption. In some embodiments, an absorption capacity after five absorption-desorption cycles in decane is at least 90% relative to an absorption capacity after the first absorption. In some embodiments, an absorption capacity after five absorption-desorption cycles in hexane is at least 90% relative to an absorption capacity after the first absorption.

In some embodiments, the modified MWCNT has a length of 0.5 μm to 100 μm. In some embodiments, the modified MWCNT has an outer diameter of 15 nm to 150 nm.

In some embodiments, the MWCNT has an outer diameter of 10 nm to 100 nm. In some embodiments, the MWCNT has a maximum linear dimension of 0.5 μm to 100 μm. In some embodiments, the MWCNT includes 3 to 9 walls.

In some embodiments, the $C_{8-26}$ carboxylate moieties comprise laurate moieties.

In a second aspect, the disclosure provides a method, including: contacting MWCNTs including an outer surface functionalized with hydroxyl groups with $C_{8-26}$ carboxylic acid to form a plurality of functionalized MWNCTs, each functionalized MWCNT including a MWCNT having $C_{8-26}$ carboxylate moieties covalently bonded thereto.

In certain embodiments, in the contacting, a ratio of the multi-walled carbon nanotubes to $C_{8-26}$ carboxylic acid is 1:5 to 1:20 by weight.

In certain embodiments, in the contacting, a ratio of the multi-walled carbon nanotubes to $C_{8-26}$ carboxylic acid is 1:10 by weight.

In certain embodiments, the contacting forms a first mixture and the method further includes: sonicating the first mixture, adding an acid to the multi-walled carbon nanotubes and $C_{8-26}$ carboxylic acid to form a second mixture, and heating the second mixture.

In a third aspect, the disclosure provides a method, including: i) contacting modified MWCNTs including MWCNTs with $C_{8-26}$ carboxylate moieties covalently attached with an aqueous solution including an organic contaminant so that the modified MWCNTs absorbs at least a portion of the organic contaminant.

In certain embodiments, the method further includes: ii) removing the modified MWCNTs with organic contaminant absorbed thereto from the aqueous solution, and iii) separating the absorbed organic contaminant from the modified MWCNTs.

In certain embodiments, i)-iii) are repeated.

In certain embodiments, the aqueous solution is produced water.

In a fourth aspect, the disclosure provides a system, including a hydrocarbon producing well, and a plurality of the modified MWCNT of the disclosure. The system is configured such that produced water including a hydrocarbon produced from the hydrocarbon producing well is contacted with the plurality of modified MWCNTs, thereby reducing a concentration of the hydrocarbon in the produced water.

In a fifth aspect, the disclosure provides a system, including a gas-oil separation plant (GOSP) and a plurality of the modified MWCNTs of the disclosure. The system is configured such that a first stream in the GOSP is contacted with the plurality of modified MWCNTs, thereby forming a second stream, and a concentration of a hydrocarbon in the second stream is lower than a concentration of the hydrocarbon in the first stream.

DETAILED DESCRIPTION

Modified MWCNTs

Figure 1:
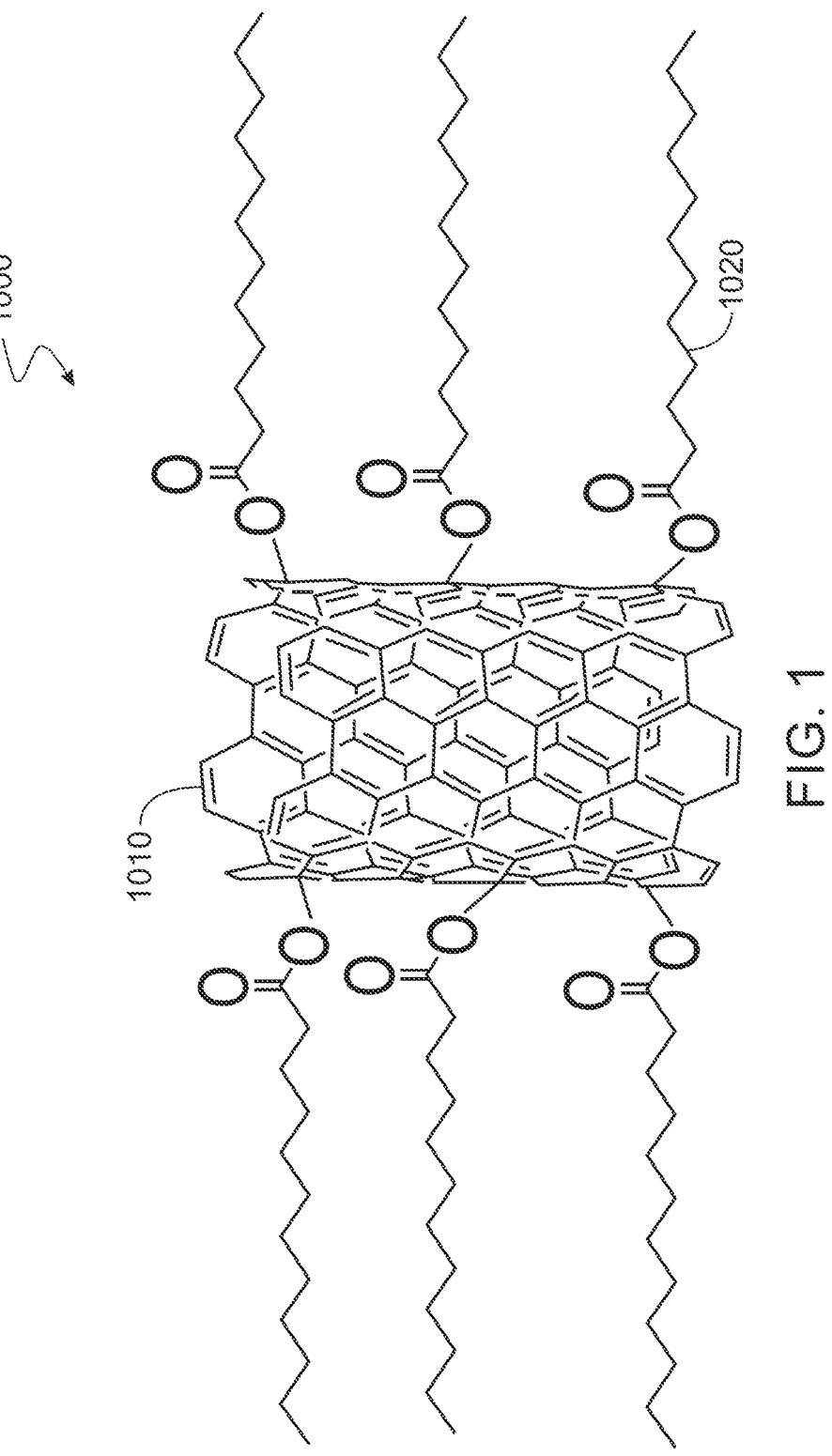
FIG. 1 depicts a schematic for a modified MWCNT.

FIG. 1 depicts a schematic of a modified MWCNT 1000. The modified MWCNT 1000 includes a MWCNT 1100 with a plurality of laurate moieties 1020 covalently bonded to the MWCNT 1100. Although the MWCNT includes a plurality of walls (see discussion below), only the outermost wall of the MWCNT 1100 is depicted for clarity. The laurate moieties 1020 attach to an outer surface of the MWCNT 1100. The laurate moieties 1020 correspond to laurate molecules which are covalently bonded to the MWCNT 1100 via an oxygen atom, as shown in FIG. 1.

MWCNTs are a form of carbon nanotubes in which multiple single-walled carbon nanotubes are nested inside one another. The carbon nanotubes are tubes made of rolled-up sheets of single layer-carbon atoms (e.g., graphene), with a diameter in the nanometer range. Without wishing to be bound by theory, it is believed that the MWCNT 1100 can provide strong mechanical stability relative to certain other nanomaterials. For example, MWCNTs demonstrate better mechanical stability relative to single walled CNTs and have a reduced cost of formation. The laurate moieties 1020 provides a relatively long chain that makes the modified MWCNT 1000 hydrophobic.

In some embodiments, the modified MWCNT 1000 has an outer diameter of at least 15 (e.g., at least 20, at least 25, at least 30, at least 35, at least 40, at least 45, at least 50, at least 55, at least 60, at least 65, at least 70, at least 75, at least 80, at least 85, at least 90, at least 95, at least 100, at least 105, at least 110, at least 115, at least 120, at least 125, at least 130, at least 135, at least 140, at least 145) nm and/or at most 150 (e.g., at most 145, at most 140, at most 135, at most 130, at most 125, at most 120, at most 115, at most 110, at most 105, at most 100, at most 95, at most 90, at most 85, at most 80, at most 75, at most 70, at most 65, at most 60, at most 55, at most 50, at most 45, at most 40, at most 35, at most 30, at most 25, at most 20) nm.

In some embodiments, the modified MWCNT 1000 has a maximum linear dimension (e.g., length) of at least 0.5 (e.g., at least 1, at least 1.5, at least 2, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95) μm and/or at most 100 (e.g., at most 95, at most 90, at most 85, at most 80, at most 75, at most 70, at most 65, at most 60, at most 55, at most 50, at most 45, at most 40, at most 35, at most 30, at most 25, at most 20, at most 15, at most 10, at most 5, at most 2, at most 1.5, at most 1) μm.

In some embodiments, the MWCNT 1100 has an outer diameter of at least 10 (e.g., at least 15, at least 20, at least 25, at least 30, at least 35, at least 40, at least 45, at least 50, at least 55, at least 60, at least 65, at least 70, at least 75, at least 80, at least 85, at least 90, at least 95) nm and/or at most 100 (e.g., at most 95, at most 90, at most 85, at most 80, at most 75, at most 70, at most 65, at most 60, at most 55, at most 50, at most 45, at most 40, at most 35, at most 30, at most 25, at most 20, at most 15) nm. In some embodiments, the MWCNT 1100 has a maximum linear dimension (e.g., length) of at least 0.5 (e.g., at least 1, at least 2, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95) μm and/or at most 100 (e.g., at most 95, at most 90, at most 85, at most 80, at most 75, at most 70, at most 65, at most 60, at most 55, at most 50, at most 45, at most 40, at most 35, at most 30, at most 25, at most 20, at most 15, at most 10, at most 5, at most 2, at most 1) μm. In some embodiments, the MWCNTs 1100 have at least 3 (e.g., at least 4, at least 5, at least 6, at least 7, at least 8) and/or at most 9 (e.g., at most 8, at most 7, at most 6, at most 5, at most 4) walls.

In certain embodiments, the amount of MWCNTs 1100 to laurate moieties 1020 in the modified MWCNT 1000 is at least 1:5 (e.g., at least 1:10, at least 1:15) and/or at most 1:20 (e.g., at most 1:15, at most 1:10) by weight. Without wishing to be bound by theory, it is believed that keeping the amount of laurate moieties 1020 higher than the amount of MWCNTs 1100 in the modified MWCNT 1000 provides more hydrophobic surface and allows the modified MWCNT 1000 to absorb more oil from water.

Without wishing to be bound by theory, it is believed that the modified MWCNT 1000 is well suited for oil-water separation applications (see discussion below) as the modified MWCNT 1000 is hydrophobic, oleophilic, and porous. Without wishing to be bound by theory, it is believed that the absorption capacity is dependent on the absorbent porosity. In general, highly porous structures will afford a relatively high level of absorption. Additionally, in general, absorbents with higher hydrophobicity will absorb oil more readily from water.

In certain embodiments, the modified MWCNT 1000 has a water contact angle of at least 135° (e.g., at least 140°, at least 145°, at most) 150° and/or at most 155° (e.g., at most 150°, at most 145°, at most) 140° measured using an Attension Theta Optical Tensiometer as described in Example 2.

Methods of Making

Figure 2:
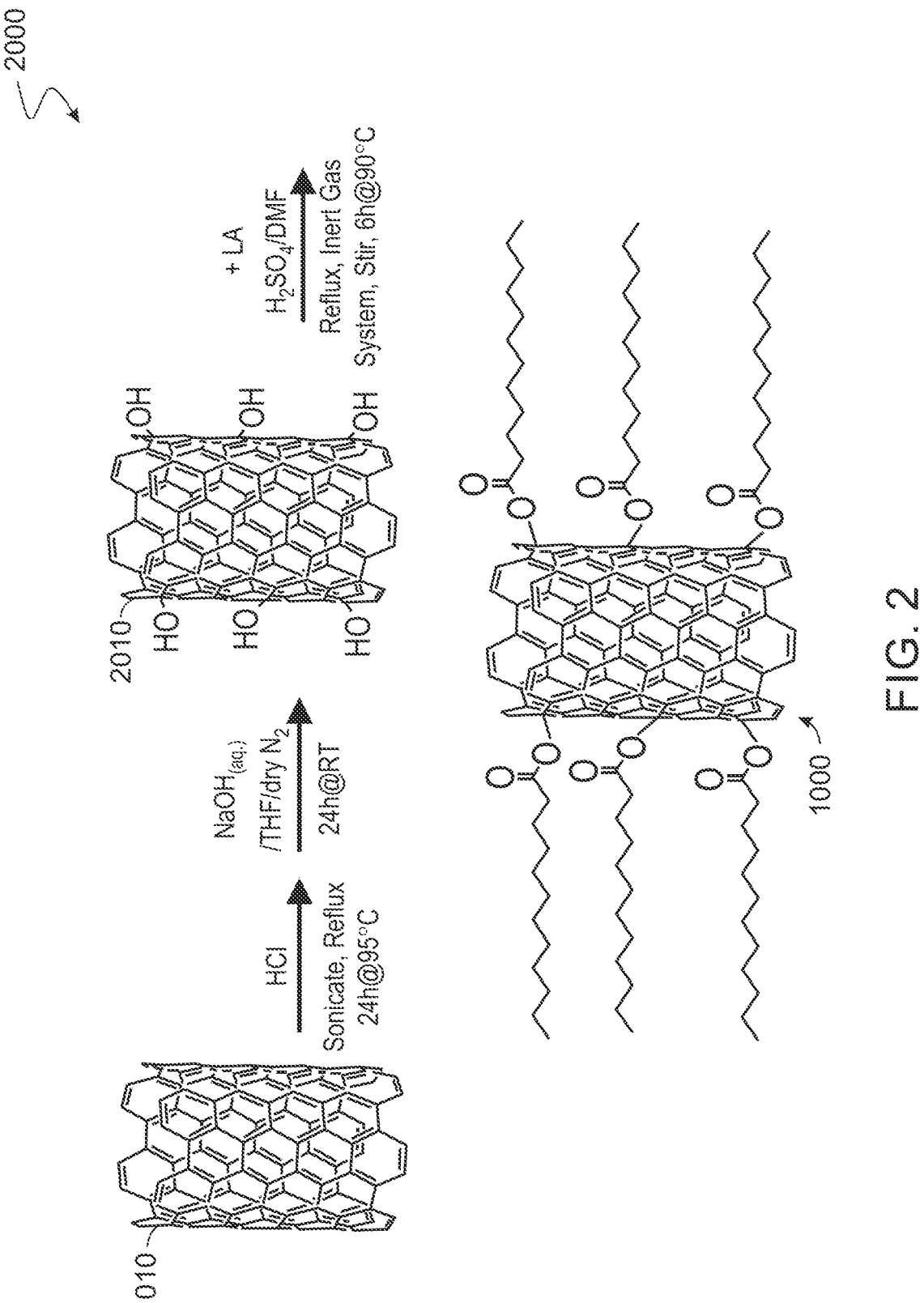
FIG. 2 depicts a schematic for a method.

FIG. 2 depicts a schematic of a method 2000 for forming the modified MWCNT 1000. MWCNTs 1010 can be treated with an acid with sonication then refluxed to create hydroxyl groups on the surface of the MWCNTs 1010. Examples of the acid include HCl, $HNO_3$ and $H_2SO_4$. The reflux can be performed at a temperature of at least 60 (e.g., at least 70, at least 80, at least 90, at least 100, at least 110, at least 120, at least 130, at least 140, at least 150° C.) and/or at most 160 (e.g., at most 150, at most 140, at least 130, at least 120, at least 110, at least 90, at least 80, at least 70° C.) The reflux can be performed for at least 1 (e.g., at least 2, at least 4, at least 6, at least 8, at least 10, at least 12, at least 14, at least 16, at least 18, at least 20, at least 22) hour(s) and/or at most 24 (e.g., at most 22, at most 20, at most 18, at most 16, at most 14, at most 12, at most 10, at most 8, at most 6, at most 4, at most 2) hours. In some embodiments, the reflux is performed for 24 hours at 95° C.

After the acid treatment and reflux, the MWCNTs 1010 are treated with a base in the presence of an organic solvent and an inert atmosphere to form MWCNTs with hydroxyl groups covalently attached (MWCNT-OH) 2010. Examples of the base include NaOH, KOH and $NH_3$. Examples of the organic solvent include THF, DMF and oxolane. Examples of the inert atmosphere include a nitrogen atmosphere and an argon atmosphere. The treatment with base can be performed at a temperature of at least 25 (e.g., at least 30, at least 40, at least 50, at least 60, at least 70, at least 80, at least 90, at least 100, at least 110° C.) and/or at most 120 (e.g., at most 110, at most 100, at most 90, at most 80, at most 70, at most 60, at most 50, at most 40, at most 30° C.) The treatment with base can be performed for at least 1 (e.g., at least 2, at least 4, at least 6, at least 8, at least 10, at least 12, at least 14, at least 16, at least 18, at least 20, at least 22) hour(s) and/or at most 24 (e.g., at most 22, at most 20, at most 18, at most 16, at most 14, at most 12, at most 10, at most 8, at most 6, at most 4, at most 2) hours. In some embodiments, the treatment with base is performed for 24 hours at room temperature.

The MWCNT-OH 2010 can be contacted with lauric acid to form the modified MWCNT 1000. The MWCNT-OH 2010 are dispersed by sonication in an organic solvent, such as DMF. Lauric acid is added to the dispersed MWCNT-OH 2010 and sonicated. An acid is then added and the resulting mixture is refluxed with continuous stirring. Examples of the acid include $H_2SO_4$. The reflux can be performed for at least 1 (e.g., at least 2, at least 4, at least 6, at least 8, at least 10, at least 12, at least 14, at least 16, at least 18, at least 20, at least 22) hour(s) and/or at most 24 (e.g., at most 22, at most 20, at most 18, at most 16, at most 14, at most 12, at most 10, at most 8, at most 6, at most 4, at most 2) hours. In some embodiments, the reflux is performed for 6 hours at 90° C.

The resulting modified MWCNT 1000 is then dried, for example using a vacuum oven. Drying in the vacuum oven can be performed at a temperature of at least 30 (e.g., at least 40, at least 50, at least 60, at least 70, at least 80, at least 90, at least 100, at least 110, at least 120° C.) and/or at most 125 (e.g., at most 120, at most 110, at most 100, at most 90, at most 80, at most 70, at most 60, at most 50, at most 40° C.) Drying in the vacuum oven can be performed for at least 2 (e.g., at least 4, at least 6, at least 8, at least 10, at least 12, at least 18, at least 24, at least 30, at least 36, at least 42, at least 48, at least 54, at least 60, at least 66) hours and/or at most 72 (e.g., at most 66, at most 60, at most 54, at most 48, at most 42, at most 36, at most 30, at most 24, at most 18, at most 12, at most 10, at most 8, at most 6, at most 4) hours. In some embodiments, drying in the vacuum oven is performed at 70° C. for 3 hours.

In certain embodiments, the ratio of MWCNT-OH 2010 to lauric acid molecules is at least 1:5 (e.g., at least 1:10, at least 1:15) and/or at most 1:20 (e.g., at most 1:15, at most 1:10). Without wishing to be bound by theory, is it believed that a ratio of 1:5 to 1:20 provides a material with relatively good oil-water separation performance. Without wishing to be bound by theory, is it believed that a ratio of 1:10 provides a material with the best oil-water separation performance relative to certain other ratios.

Without wishing to be bound by theory, it is believed that the chemical functionalization of the MWCNT 1100 surface is achieved by the attachment of the hydroxyl groups to the $sp^2$ hybridized carbon framework. Lauric acid molecules then attach to the MWCNT-OH 2010 to form the modified MWCNT 1000 via an ester linkage by the esterification reaction between the carboxyl groups of the lauric acid molecules and the hydroxyl groups of the MWCNT-OH 2010.

Methods of Use

The modified MWCNTs can be used in oil spill remediation and/or oil-water separation applications, such as to remove an organic contaminant from water. For example, the modified MWCNTs can be used in an oil spill, a pipe leak, and in columns. In some embodiments, the oil spill or pipe leaks occurs in a body of water. Examples of the organic contaminant include a produced hydrocarbon, crude oil, an organic compound, an organic solvent, and a hydrocarbon with the formula $C_{2n}H_{2n}$. Specific organic contaminants can include hexane, decane, dodecane, and hexadecane.

The modified MWCNT 1000 can be packed into a filter bag, such as a filter bag made of polypropylene membrane with pore size of 2 μm, or in a column, and the filter bag or column can be disposed in water to remove the organic contaminant.

The modified MWCNT 1000 can be used in the treatment of produced water. In certain embodiments, the modified MWCNT 1000 can be used in a secondary and/or tertiary separation step(s) in combination with a gravity separation method for the separation of oil from water to ensure that the oil-water separation specifications are met. In some embodiments, the modified MWCNT 1000 is placed in a filtration unit to recover oil from produced water.

In some embodiments, after the produced water is contacted with the modified MWCNT 1000, the produced water is injected (e.g., reinjected) into a well. The oil content in produced water needs to be reduced to relatively low concentrations to avoid blocking the formation. The use of the modified MWCNT 1000 in the treatment of produced water also allows for the recovery of oil trapped in the produced water, which would normally be injected into the injection or disposal well.

The modified MWCNT 1000 can be used for oil-water separation in a gas-oil separation plant (GOSP). The modified MWCNT 1000 can reduce (e.g., eliminate) the use of certain chemical additives used for oil-water separation.

Generally, after absorbing an organic contaminant, the absorbed organic contaminant can be removed from the modified MWCNT 1000, allowing the modified MWCNTs to be recycled. In some embodiments, the modified MWCNTs 1000 can be recycled at least once (e.g., at least twice, at least three times, at least four times, at least five times).

In certain embodiments, the modified MWCNT 1000 has an absorption capacity (see Example 3) of at least 20 (e.g., at least 25, at least 30) g/g and/or at most 35 (e.g., at most 30, at most 25) g/g for hexadecane. In certain embodiments, the modified MWCNT 1000 has an absorption capacity of at least 15 (e.g., at least 20, at least 25, at least 30) g/g and/or at most 35 (e.g., at most 30, at most 25) g/g for dodecane. In certain embodiments, the modified MWCNT 1000 has an absorption capacity of at least 15 (e.g., at least 20, at least 25, at least 30) g/g and/or at most 35 (e.g., at most 30, at most 25) g/g for decane. In certain embodiments, the modified MWCNT 1000 has an absorption capacity of at least 15 (e.g., at least 20, at least 25, at least 30) g/g and/or at most 35 (e.g., at most 30, at most 25) g/g for hexane.

In some embodiments, the modified MWCNT 1000 has an separation efficiency (see Example 4) of at least 70 (e.g., at least 75, at least 80, at least 85, at least 90, at least 91, at least 92, at least 93, at least 94, at least 95, at least 96, at least 97, at least 98, at least 99, at least 99.5, at least 99.8, at least 99.9, at least 99.99) % for hexadecane, dodecane, decane and/or hexane in water.

In certain embodiments, the modified MWCNT 1000 has an absorption capacity of at least 20 (e.g., at least 25, at least 30) g/g and/or at most 35 (e.g., at most 30, at most 25) g/g for hexadecane after 5 absorption-desorption cycles. In certain embodiments, the modified MWCNT 1000 has an absorption capacity of at least 15 (e.g., at least 20, at least 25, at least 30) g/g and/or at most 35 (e.g., at most 30, at most 25) g/g for dodecane after 5 absorption-desorption cycles. In certain embodiments, the modified MWCNT 1000 has an absorption capacity of at least 15 (e.g., at least 20, at least 25, at least 30) g/g and/or at most 35 (e.g., at most 30, at most 25) g/g for decane after 5 absorption-desorption cycles. In certain embodiments, the modified MWCNT 1000 has an absorption capacity of at least 15 (e.g., at least 20, at least 25, at least 30) g/g and/or at most 35 (e.g., at most 30, at most 25) g/g for hexane after 5 absorption-desorption cycles.

In certain embodiments, an absorption capacity after five absorption-desorption cycles in hexane, decane, dodecane and/or hexadecane is at least 90 (e.g., at least 91, at least 92, at least 93, at least 94, at least 95, at least 96, at least 97, at least 98, at least 99, at least 99.5, at least 99.8, at least 99.9, at least 99.99) % relative to the absorption capacity after the first absorption for the modified MWCNT 1000.

EXAMPLES

Example 1

About 1.5 g of MWCNTs (techinstro.com, Product Series-TI-MWCNT, HS Code-38249090) and 6 M HCl were introduced into a round-bottom flask, sonicated for 0.5 h and then refluxed at 95° C. for 24 h. The resulting suspension was filtered, and the precipitate was thoroughly washed with water to achieve a neutral pH and was dried at 70° C. After the completion of the reaction, the resulting mixture was poured into 500 mL of DI water under continuous stirring and filtered. The black precipitate was then washed with DI water and ethanol. The hydroxylated MWCNTs were vacuum dried at 70° C. for one day, and the product was denoted as MWCNTs-OH.

Three different absorbent modified MWCNTs were prepared with varying amounts of lauric acid relative to MWCNT to obtain MWCNT: lauric acid weight ratios of 1:5 (MWCNT-L1), 1:10 (MWCNT-L2) and 1:20 (MWCNT-L3).

MWCNTs-OH were dispersed by sonication in 50 mL DMF. Lauric acid was added to the dispersed MWCNTs-OH, and the mixture was sonicated for 0.5 hours. The amounts of MWCNTs-OH and lauric acid were selected to achieve the weight ratios above. About 1 mL of concentrated $H_2SO_4$ (2 molar) was added, and the resulting mixture was kept under reflux with continuous stirring at 90° C. for 6 hours. The resulting absorbent modified MWCNTs were then placed in a vacuum oven and dried at 70° C. for 3 hours.

Example 2

The influence of surface roughness and surface energy on the wettability characteristics of the absorbent materials prepared in Example 1 was evaluated by measuring the contact angle. Contact angle measurements were performed using an Attension Theta Optical Tensiometer. About 5 μL droplet of distilled water was pipetted and deposited on the material surface at room temperature. Then, the contact angle of the contact between the water drop and the surface was measured.

Figure 3D:
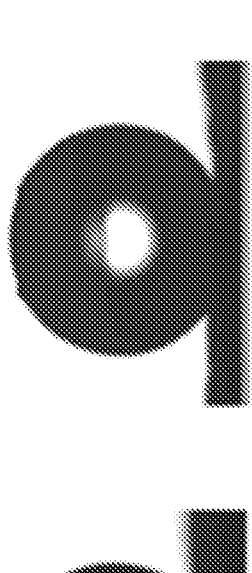
FIG. 3D depicts a water contact angle measurement.
Figure 3C:
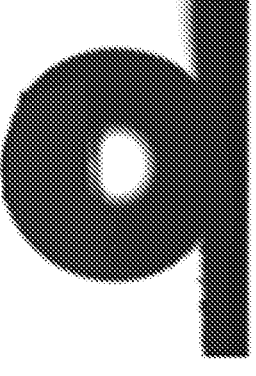
FIG. 3C depicts a water contact angle measurement.
Figure 3B:
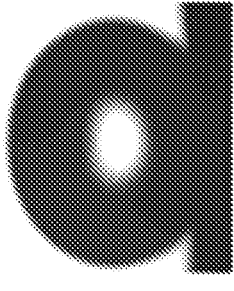
FIG. 3B depicts a water contact angle measurement.
Figure 3A:
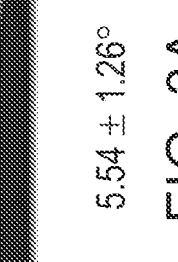
FIG. 3A depicts a water contact angle measurement.
Figure 3A:
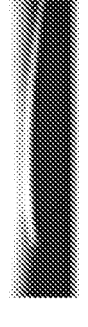

After five measurements at separate points on the surface of each sample, the water contact angle (WCA) was shown to have a mean value of 5.54±1.26° on the MWCNTs (FIG. 3A), while MWCNT-L1, MWCNT-L2 and MWCNT-L3 exhibited average WCAs of 141.02±1.46°, 145.26±1.57° and 140.08±1.75°, respectively (FIGS. 3B-3D, respectively). The MWCNTs displayed a considerably lower WCA relative to the MWCNTs with laurate covalently attached (MWCNT-L1, MWCNT-L2 and MWCNT-L3) due to the presence of the hydrophilic oxygenated groups on their surface, whereas the WCAs of all the three MWCNT-Ls had mean values of at least 140°, with MWCNT-L2 exhibiting the highest WCA. The long alkyl chains of laurate impaired the water permeability of the MWCNTs, and thus increased the WCAs of the modified MWCNTs. Hence, chemical grafting of the MWCNTs with low-surface-energy laurate successfully switched the surface from hydrophilic to hydrophobic, which is desirable for application in oil-water separation. The oleophilic-hydrophobic feature of MWCNTs-L2 can be observed from these images. It can be observed that the MWCNT-L2 had the highest contact angle and the best performance in term of absorbing the oil from water (see subsequent examples).

Example 3

Figure 4:
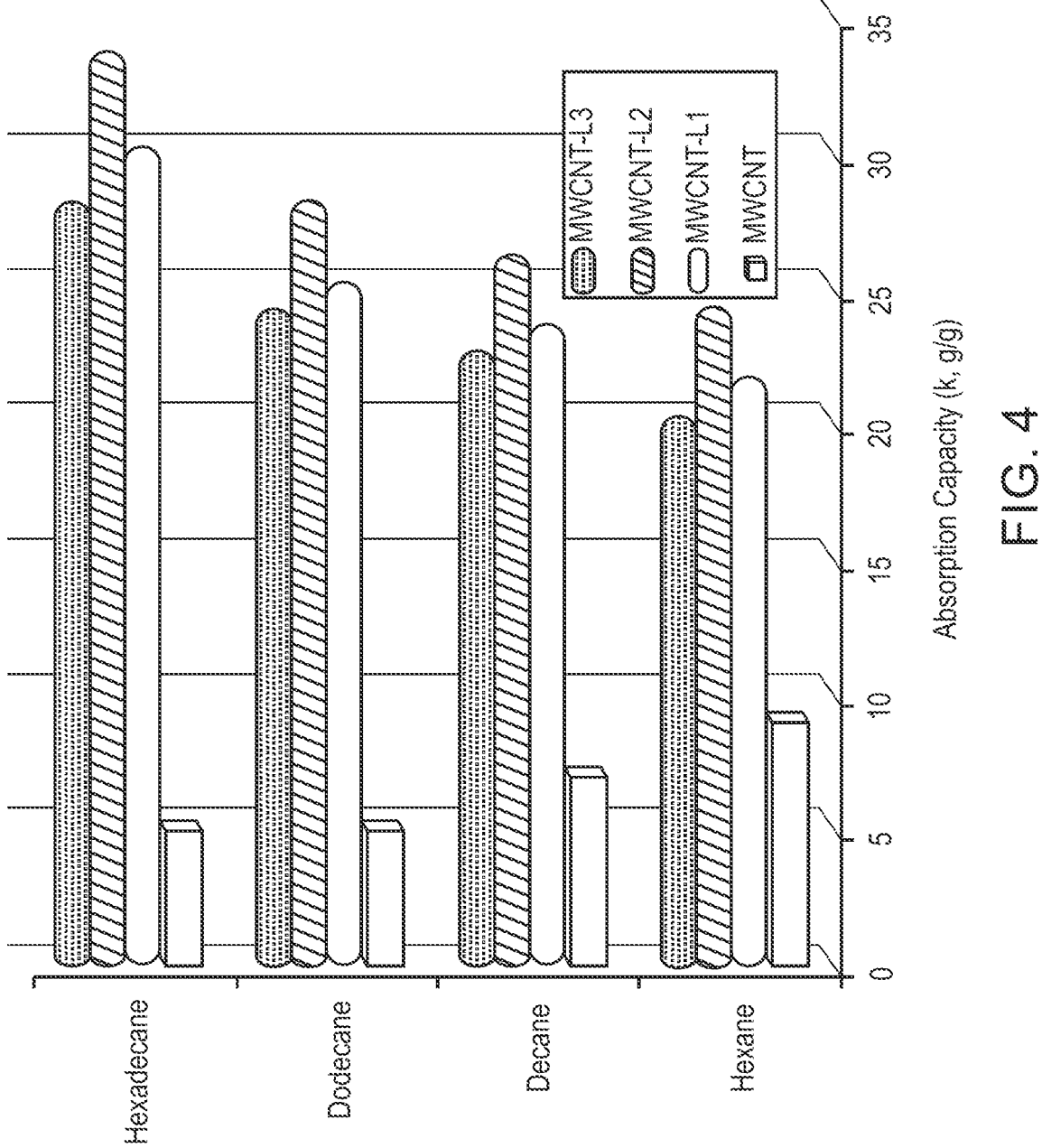
FIG. 4 depicts a graph of absorption capacity for various organic compounds.

1:1 organic-water mixtures with n-hexane, n-decane, n-dodecane or n-hexadecane were prepared and 0.3 g of preweighed absorbent was dipped in 10 mL of the mixture and pressed in the liquid for maximum absorption. The absorbent was left in the organic-water mixture for 1 to 5 minutes to absorb the organic compound. After absorption, the saturated absorbent was collected, compressed manually with the aid of a quick-grip clamp, and its weight was recorded. Then, the saturated absorbent was squeezed to expel the absorbed organic compound. The processes was repeated three times, and the average weights were recorded. The absorption capacity was calculated according to the following equation (1):

$$\text{Absorption capacity} = \frac{m_c - m}{m} \quad (1)$$

where $m_c$ is the weight of absorbent after absorption in g, and m is the weight of absorbent before absorption (dry). The results are presented in FIG. 4.

MWCNT-L2 displayed the best absorption capacity of the three absorbents with a k value of 24.0 to 33.5 times its own weight for the various organic compounds tested. Without wishing to be bound by theory, the k value (g/g) of an absorbent material correlates with the viscosity, density and surface tension of the organic compound or organic-water mixture. The organic compound percolated in the pores of the 3D network of the MWCNTs with laurate covalently attached. The density of the percolated oils determined the k value of the absorbent when its porosity was saturated by the organic compound. Significantly, MWCNTs-L2 showed the greatest absorption capacity relative to the other modified MWCNTs.

Example 4

Figure 5:
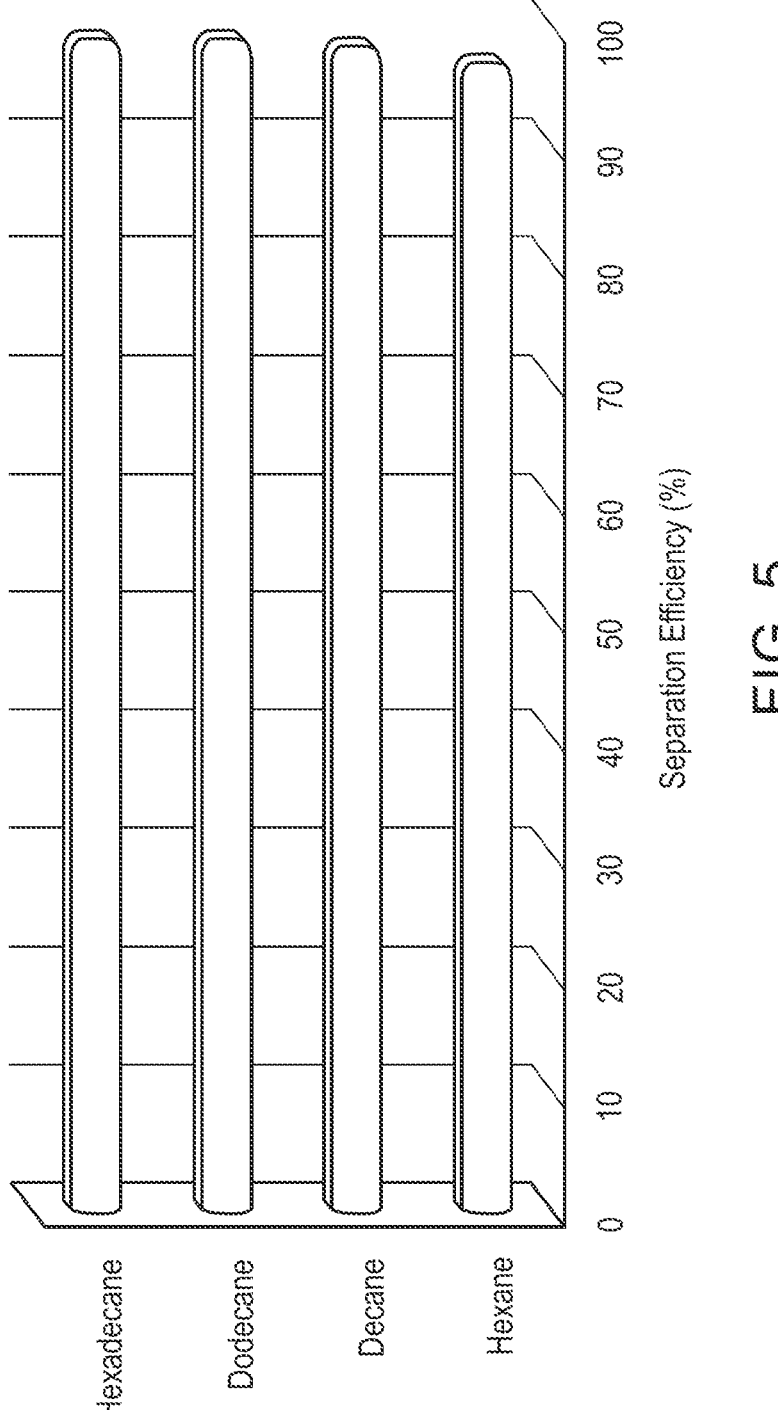
FIG. 5 depicts a graph of separation efficiency for various organic compounds.

0.3 g MWCNT-L2 was placed in a 1:1 organic-water mixture with n-hexane, n-decane, n-dodecane or n-hexadecane for absorption until saturation with the liquid, typically 1 to 5 minutes. The absorbent material was then taken out using tweezers, drained for 30 seconds to 5 minutes and then squeezed to expel the organic compound. The separation efficiency of the absorbent was computed according to equation (2):

$$\text{Separation efficiency (\%)} = \frac{m_r}{m_0} \times 100 \qquad (2)$$

where $m_r$ is the weight of the retrieved organic compound, which was absorbed, collected and weighed, and $m_0$ is the weight of the organic compound added in the organic-water mixture. The results are presented in FIG. 5. The separation efficiency for MWCNT-L2 varied from 97% in hexane up to 99% in hexadecane.

Example 5

Figure 6:
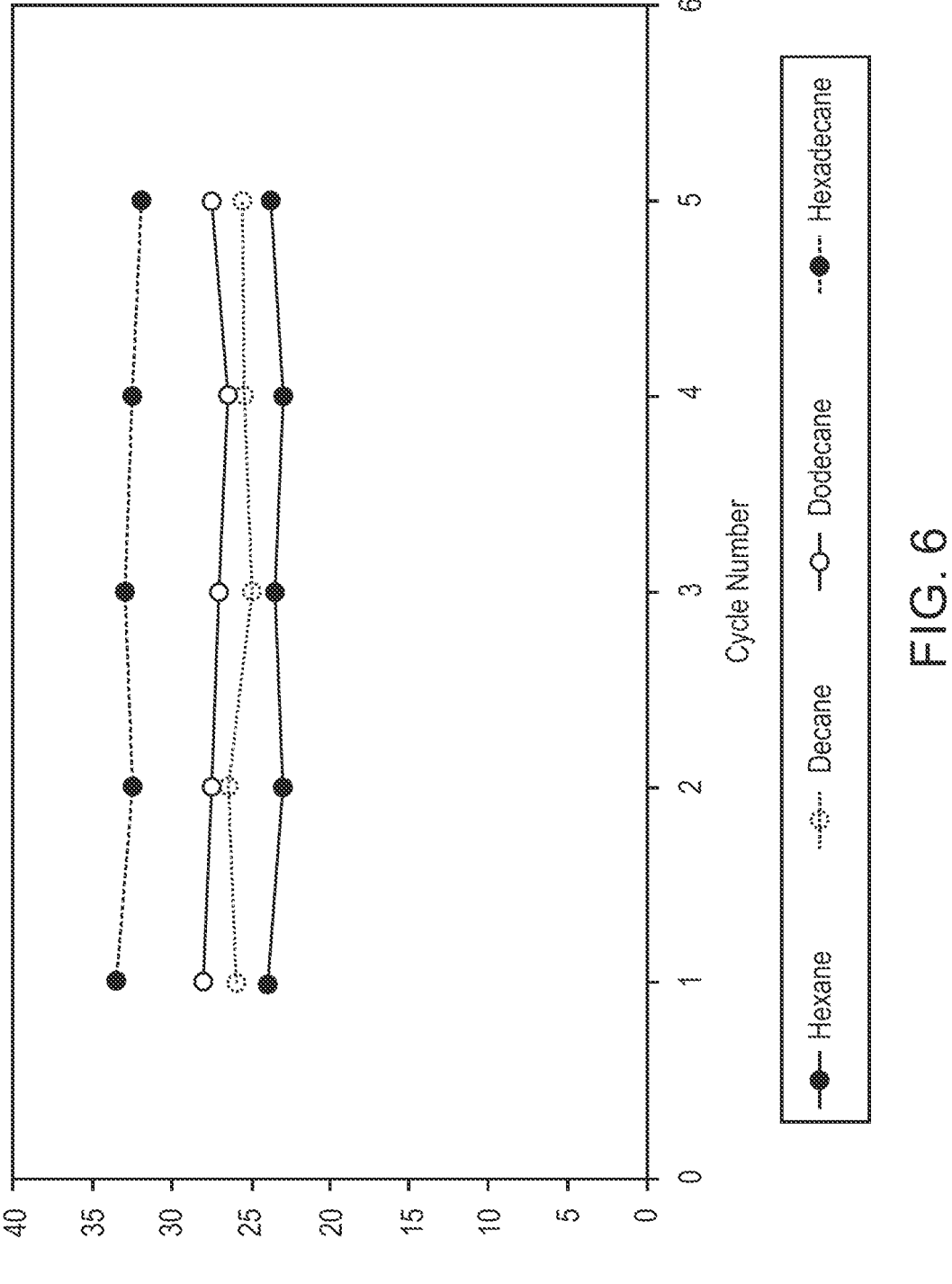
FIG. 6 depicts a graph of absorption capacity for various organic compounds as a function of the number of cycles.

Absorption-desorption tests were carried out on MWCNT-L2 for five cycles using the methods of Example 3 with desorption between cycles performed by squeezing. The results are presented in FIG. 6. The experiment showed that the absorption capacity of MWCNT-L2 was highly stable as the absorption capacity of over 90% was sustained for at least five cycles of the absorption-desorption experiment.

OTHER EMBODIMENTS

While certain embodiments have been disclosed above, the disclosure is not limited to such embodiments.

As an example, while embodiments have been disclosed in which the modified MWCNT 1000 includes a MWCNT 1100 with a plurality of laurate moieties 1020 covalently bonded to the MWCNT 1100, the disclosure is not limited to such embodiments. In general, the modified MWCNT can include a MWCNT with a plurality of $C_{8-26}$ carboxylate moieties covalently bonded to the MWCNT. In some embodiments, in addition to or in alternative to laurate moieties, the modified MWCNT includes a MWCNT with a plurality of caprylate moieties, caprate moieties, myristate moieties, palmitate moieties, stearate moieties, arachidate moieties, behenate moieties, lignocerate moieties, and/or cerotate moieties covalently bonded to the MWCNT.

As another example, while embodiments have been disclosed that include contacting MWCNT-OH 2010 with lauric acid to form the modified MWCNT 1000, the disclosure is not limited to such embodiments. In some embodiments, in addition to or in alternative to hydroxyl groups, MWCNTs functionalized with carboxyl groups can be contacted with lauric acid to form the modified MWCNTs 1000.

What is claimed:

1. A modified multi-walled carbon nanotube (MWCNT) comprising:

a MWCNT comprising an outer surface; and a plurality of $C_{8-26}$ carboxylate moieties covalently bonded to the multi-walled carbon nanotube.

2. The modified MWCNT of claim 1, wherein the MWCNT comprises an outer surface, and the plurality of $C_{8-26}$ carboxylate moieties are covalently bonded to the outer surface.

3. The modified MWCNT of claim 1, wherein the modified MWCNT has a water contact angle of 135° to 150°.

4. The modified MWCNT of claim 1, wherein at least one of the following holds:

the modified MWCNT has an absorption capacity of at least 25 g/g for hexadecane;

the modified MWCNT has an absorption capacity of at least 20 g/g for dodecane;

the modified MWCNT has an absorption capacity of at least 20 g/g for decane; or the modified MWCNT has an absorption capacity of at least 15 g/g for hexane.

5. The modified MWCNT of claim 1, wherein at least one of the following holds:

the modified MWCNT has a separation efficiency of at least 90% for hexadecane in water;

the modified MWCNT has a separation efficiency of at least 90% for dodecane in water;

the modified MWCNT has a separation efficiency of at least 90% for decane in water; or the modified MWCNT has a separation efficiency of at least 90% for hexane in water.

6. The modified MWCNT of claim 1, wherein at least one of the following holds:

the modified MWCNT has an absorption capacity of at least 25 g/g for hexadecane after 5 cycles of oil water separation;

the modified MWCNT has an absorption capacity of at least 20 g/g for dodecane after 5 cycles of oil water separation;

the modified MWCNT has an absorption capacity of at least 20 g/g for decane after 5 cycles of oil water separation; or the modified MWCNT has an absorption capacity of at least 15 g/g for hexane after 5 cycles of oil water separation.

7. The modified MWCNT of claim 1, wherein at least one of the following holds:

an absorption capacity after five absorption-desorption cycles in hexadecane is at least 90% relative to an absorption capacity after the first absorption;

an absorption capacity after five absorption-desorption cycles in dodecane is at least 90% relative to an absorption capacity after the first absorption;

an absorption capacity after five absorption-desorption cycles in decane is at least 90% relative to an absorption capacity after the first absorption; or an absorption capacity after five absorption-desorption cycles in hexane is at least 90% relative to an absorption capacity after the first absorption.

8. The modified MWCNT of claim 1, wherein at least one of the following holds:

the modified MWCNT has a length of 0.5 μm to 100 μm; or the modified MWCNT has an outer diameter of 15 nm to 150 nm.

9. The modified MWCNT of claim 1, wherein the $C_{8-26}$ carboxylate moieties comprise laurate moieties.

10. The modified MWCNT of claim 1, wherein at least one of the following holds:

the MWCNT has an outer diameter of 10 nm to 100 nm;

the MWCNT has a maximum linear dimension of 0.5 μm to 100 μm; or the MWCNT comprises 3 to 9 walls.

11. A method comprising:

contacting multi-walled carbon nanotubes (MWCNTs) comprising an outer surface functionalized with hydroxyl groups with $C_{8-26}$ carboxylic acid to form a plurality of functionalized MWNCTs, each functionalized MWCNT comprising a MWCNT having $C_{8-26}$ carboxylate moieties covalently bonded thereto.

12. The method of claim 11, wherein, in the contacting, a ratio of the multi-walled carbon nanotubes to $C_{8-26}$ carboxylic acid is 1:5 to 1:20 by weight.

13. The method of claim 11, wherein, in the contacting, a ratio of the multi-walled carbon nanotubes to $C_{8-26}$ carboxylic acid is 1:10 by weight.

14. The method of claim 11, wherein the contacting forms a first mixture and the method further comprises:

sonicating the first mixture;

adding an acid to the multi-walled carbon nanotubes and $C_{8-26}$ carboxylic acid to form a second mixture; and heating the second mixture.

15. A method comprising:

i) contacting modified MWCNTs comprising MWCNTs with $C_{8-26}$ carboxylate moieties covalently attached with an aqueous solution comprising an organic contaminant so that the modified MWCNTs absorbs at least a portion of the organic contaminant.

16. The method of claim 15, further comprising:

ii) removing the modified MWCNTs with organic contaminant absorbed thereto from the aqueous solution; and iii) separating the absorbed organic contaminant from the modified MWCNTs.

17. The method of claim 16, wherein i)-iii) are repeated.

18. The method of claim 15, wherein the aqueous solution is produced water.

19. A system comprising:

a hydrocarbon producing well; and a plurality of the modified MWCNT of claim 1, wherein the system is configured such that produced water comprising a hydrocarbon produced from the hydrocarbon producing well is contacted with the plurality of modified MWCNTs, thereby reducing a concentration of the hydrocarbon in the produced water.

20. A system, comprising:

a gas-oil separation plant (GOSP); and a plurality of the modified MWCNTs of claim 1, wherein:

the system is configured such that a first stream in the GOSP is contacted with the plurality of modified MWCNTs, thereby forming a second stream; and a concentration of a hydrocarbon in the second stream is lower than a concentration of the hydrocarbon in the first stream.

\* \* \* \* \*